Figure 1:
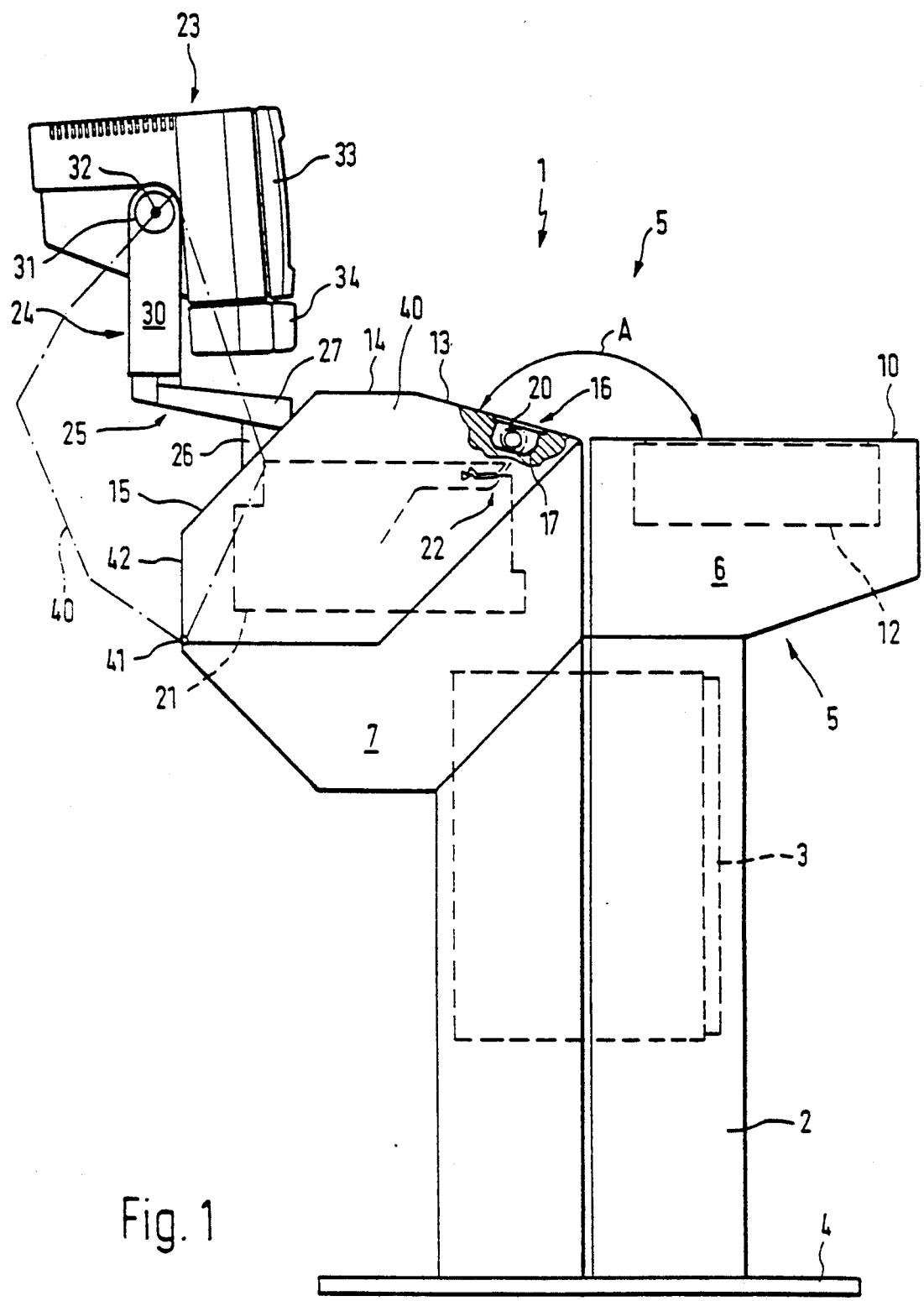

United States Patent [19]

Wieschemann et al.

[11] Patent Number: 5,316,107
[45] Date of Patent: May 31, 1994

[54] DEVICE FOR CHECKING OUT GOODS

[75] Inventors: Siegfried Wieschemann, Paderborn; Günter Baitz; Hartmut Kamin, both of Berlin, all of Fed. Rep. of Germany

[73] Assignee: Siemens Nixdorf Informationssysteme AG, Paderborn, Fed. Rep. of Germany

[21] Appl. No.: 6,100

[22] Filed: Jan. 15, 1993

Related U.S. Application Data

[63] Continuation of Ser. No. 654,615, Feb. 18, 1991, abandoned.

[30] Foreign Application Priority Data

Jun. 20, 1989 [EP] European Pat. Off. ........ 89111174.2
Sep. 14, 1989 [DE] Fed. Rep. of Germany ... 8911035[U]

[51] Int. Cl.⁵ ............................................. A47F 9/04
[52] U.S. Cl. .................................................... 186/61
[58] Field of Search .................... 186/61; 235/383

[56] References Cited

U.S. PATENT DOCUMENTS

| | | | |
|---|---|---|---|
| 3,819,012 | 6/1974 | Beck et al. | 186/61 |
| 4,138,000 | 2/1979 | Hartup | 186/61 |
| 4,676,343 | 6/1987 | Humble et al. | 235/383 X |
| 4,779,706 | 10/1988 | Mergenthaler | 186/61 |
| 4,909,356 | 3/1990 | Rimondi et al. | 186/61 |
| 4,959,530 | 9/1990 | O'Connor | 235/383 |
| 5,021,640 | 6/1991 | Muroi | 186/61 |

*Primary Examiner*—F. J. Bartuska
*Attorney, Agent, or Firm*—Dykema Gossett

[57] ABSTRACT

For purposes of the smooth and rapid checking out especially even of damaged goods labels, a process for the checking out of goods is proposed in which the data concerning them are automatically, and preferably also manually in the event of faulty checking, entered in the check-out device. In addition, at least two devices for implementing the process are described which have a goods check-out device with both an automatic scanning device and a manually operable input console. One of these devices also makes it possible to relieve and reduce the number of the service staff.

9 Claims, 10 Drawing Sheets

DEVICE FOR CHECKING OUT GOODS

This is a continuation of copending application Ser. No. 07/654,615 filed on Feb. 18, 1991, now abandoned.

The invention pertains to a method and to devices for checking out goods according to the present invention.

One such method or devices are known from U.S. Pat. No. 4,779,706 and from DE-OS 35 24 231. In the method known from U.S. Pat. No. 4,779,706 the customer with his articles placed in a shopping cart moves to a check-out area, places the particular goods singly onto a scale combined with a scanner, and then into a purchase bag located on another scale. The article identifications attached to the goods are ascertained with the scanner and they are fed to a computer. The computer memory contains the price and weight of the articles, among other things. If the actual weight agrees with the stored weight, then the scanned article is placed into the purchase bag.

A disadvantage is that goods registry, even of properly identified goods, can take place only very slowly and that goods or articles with incomplete or no goods identifier cannot be registered by the customer.

The invention is based on the problem of specifying a method of the above type where the goods check-out runs smoother and faster, even for improperly identified goods, and to create a device to implement the method.

This problem is solved by a procedure and device according to the present invention.

Normally, the goods identifier of the individual articles is read by the scanner of a sensing device. In known devices described above, goods with damaged identifiers cannot be registered by the customer. The same is true for identifiers attached to articles that cannot be reached by the scanner. The invented method allows automatic registration of goods data when the identification is complete and attached to the article so that it can be reached by the scanner or run past a goods registry window. The invented method also makes it possible to input goods data manually, preferably after a signal output, if for example, the goods identification is damaged or incomplete. Naturally, it is also possible to input the goods data manually into the goods registry device, e.g., by an input keyboard in the check-out area, if the article identifier is properly and completely mounted to the article and could in principle be registered automatically.

Preferably, the goods data of a particular item can also be registered partly automatically, and partly manually input. It is also possible to acquire incomplete goods identifiers with the scanner and to input the rest of the identifier manually, i.e., using an input keyboard. For example, certain groups of goods (fruit/vegetables, fresh meat, groceries, hardware items etc.) can be input with the keyboard, while the identifier is read in by machine. Thus, it is possible to use several places of the machine-readable article number specified in the digital string for other purposes, like e.g., weight information. This is particularly interesting for weight-variable goods, like e.g., fruit. At the fruit stand the desired quantity will be collected in a bag that is then weighed on a scale printing out machine-readable labels. After input of the article identifier into the keyboard on the scale, a, e.g., self-adhesive label with machine-readable weight, item and/or price statement is printed which the customer sticks to the bag. In the check-out area of the goods registry device, the label can be read by the scanner. Only the goods class, e.g., fruit, will be input manually, whereupon the computer can uniquely identify the article and multiply the weight by the price. Consequently, the self-adhesive label need not have any price information. The scale in such cases need not be "intelligent" and need not be connected to the POS system.

Another advantage is automatic registry of goods data and manual input of the number of the particular items. In this case, a multiplication key is provided so that for larger quantities of the same article, one sample can be automatically registered (scanned) and then the number and multiplication command input manually on a keyboard. This leads to faster goods registry.

In another refinement of the method, already registered goods are automatically and/or manually taken out of the sale. In this case, a cancel key can be provided which allows already registered articles to be cancelled from sale. This withdrawal may be desired by the customer when an article is damaged, the customer does not wish to buy the article, or if the resulting purchase price cannot be paid in cash.

When cancelling the last registered article from the sale, it is sufficient to operate the cancel key and the article will be withdrawn. When cancelling formerly registered articles, upon operation of a correction key, the list of formerly registered articles will be printed in sequence on the screen. Now several articles can be displayed, and only one will be identified by a symbol as cancelled. By repeated operation of the correction key, the goods list can be run past the cancel symbol. By operation of the cancel key, the article identified by the cancel symbol will be subtracted. Furthermore, it is possible to make a cancellation by repeat input of the article identifier. Now the article identifier of the article to be cancelled, is input again with the scanner or input keyboard and then the cancel key is operated. The computer will check in this case, to determine whether this item had already been registered once; if this is the case, it deletes this item from the sale. This method is particularly suitable for goods registry devices with minimal equipment where neither a screen nor a cash register printer is available.

In another sample design, a light barrier can be provided in front of or behind the goods registry window in the goods movement direction; this light barrier can determine the direction of goods movement. Movement of the item to be registered in the direction of the store exit causes registry of the article, but movement in the opposite direction causes cancellation of the particular article. The light barriers can also operate for non(machine readable) goods identification. Then the ergonomically logical return motion will be made and then the goods identification input on the input keyboard. Thus operation of the cancel key can be omitted.

The tasks described above can be performed by a goods registry device with the properties of Patent Claim 6.

The inclination angle in the range from 135° to 180° between the control surfaces and the goods registry surface allows unrestricted transfer of the goods-identifiers attached to the goods in the direction of the goods registry window. Even bulky, e.g., elongated articles, can be readily turned and rotated, and an accidental operation or contact of operating elements and/or input/output openings located on the control surface is mostly precluded. The edge located in the apex of the inclination angle between the control surface and the goods registry surface with rising control surface slightly transverse to the goods transport direction, holds box-like or cylindrical goods preferably on the goods registry surface so that these goods cannot get onto the control surface under normal load. With this type of inclination angle, there is sufficient space available for goods registry, so that the goods overall can be delivered faster.

Preferably, the inclination angle lies in a range from 155° to 180°, preferably at 165°. This type of control surface can still be readily seen on the side facing the customer, on the other side the control surface blocks the view of the goods registry surface little or not at all, so that the operator can quickly survey the goods registry surface from nearly all sides. This type of positioned control surface allows the installation of control elements and/or input/output openings and on the other hand, also represents a part of the transport surface needed for oversized goods packages, so that such packages can be placed at least partly also on the control surface.

It is an advantage to place an adjustable data display with pedestal on an upper part holding the control surface. Thus, it is possible to position the screen in a location favorable for the customer, so that all information displayed on the screen can be easily seen and read. The support unit also ensures transfer of the display terminal into a position facing away from the goods registry and control surface, so that even oversized goods packages can be readily passed over the goods registry surface.

It is also favorable to place the input keyboard underneath the screen, since in this manner the data input by keyboard can be quickly checked for accuracy with a glance at the neighboring screen. But it is also possible to integrate the input keyboard into a part of the screen, so that it is smaller, but no additional feature is needed to hold the keyboard. In this design it is favorable for the screen and keyboard to form a smooth surface so they can be configured in an optically pleasing manner.

Likewise, the keyboard can be one of the control elements located on the control surface. In this case, the keyboard is placed nearer the goods transport path and thus is more accessible for the user performing the goods registry.

The data terminal can also be located in the control surface. Thus, it is possible to create a very compact goods registry device that is generally protected against damage due to blocking articles. Features protruding from the goods registry device can be omitted in this case. It is favorable, especially when using a keyboard in the control surface, that the goods-related data input by scanner or keyboard, be easily and quickly checkable based on the data display located near the goods registry window or keyboard.

In a refinement of the invention the input keyboard and data terminal are located axially behind one another transverse to the goods registry window of the goods registry surface. This placement also allows a fast check of the data input or registered by keyboard or scanner located under the goods registry window. Since the user stands in front of the goods registry window when operating the goods registry device, he can check the registered data merely by glancing up and without turning his head.

It is also favorable to design the output openings located in the control surface as closable output box for a receipt, e.g., a goods registry receipt, since this type of output box lies in the field of view of the user so that he can easily remove the receipt at conclusion of the registry process. And secondly, the receipt in the closable output box is secured against accidental tear-off or damage. In addition, this type of goods registry device can be readily installed in a feed and delivery system since no controls and/or input/output openings are placed on the side walls or rear wall of such a device.

Preferably, the output box is of trough-shaped design and equipped with a flap cover and preferably with a slit in the base wall of the box to feed in the strip-like receipt. The trough-shaped formation of the output box makes it easier to remove, while the flap cover acts to protect against accidental damage to the receipt during goods registry. The slit allows easy feed of the strip receipt from a supply roll into a receipt printer.

In accordance with a refinement of the invention, the output box has a partly cylindrical inside wall at least on its end. This shape allows simple and easy feed of the receipt exiting from the slit. Usually one printed line is needed for each registered article, so that the receipt lengthens steadily during the registry process. A partly cylindrical inner wall prevents plugging of the output box and allows roll up of the strip-like receipt. In addition, the receipt can be easily removed for this type of formation of the output box.

It is also favorable that the flap cover pivot around a bearing pin, preferably transverse to the goods transport direction, and the opening of the output box with opened flap cover points preferably in the direction of the transport path. By this type of design, the flap cover is easy to open and the output box is easily accessible from the goods registry side. Moreover, a pivot motion can be quickly implemented without great application of force.

But it is also favorable if the flap cover has a partly cylindrical underside—at least at its ends—adapted to the inside wall of the output box; this underside is preferably a guide rib with outer wall positioned transverse to the flap cover upper side. Thus, during feed of the receipt through the slit provided in the output box, an automatic roll-up of the elongated receipt in the output box is ensured, without any mechanically driven coiling device being needed. The partly cylindrical inside wall of the output box and the partly cylindrical underside of the flap cover allow a circular or elliptical path of the receipt with the flap cover closed. This receipt thus forms a loose roll in the output box. This ensures that even for numerous goods printed on the receipt, no paper stack-up occurs in the output box. When opening the flap cover, the coiled receipt will be pushed by a certain amount through the guide rib formed on the underside of the flap cover from the output box in the direction of the goods transport path so that the receipt can be easily taken by the user.

The device performs the above-described task by a goods registry and check-out system in accordance with the present invention.

In contrast to previous goods registry and accounting systems, the invention uses a principle that relieves the operating personnel so that the customer himself participates in the goods registry and accounting or performs it independently. Thus, it is possible to set up the sales route for the goods so that one operating person can monitor several check-out stands without having to intervene actively in goods registry and sales. Thus, he is relieved of physical stress but is still included in goods registry and check-out to the extent of being available if necessary to intervene in the running process. In a system using the invention, the sales route runs directly by the check-out unit which is thus entirely included in the check-out path and is no longer set up next to it. Since the check-out unit is operable by the customer, the customer can carry out goods registry and check-out independently and input article numbers and/or prices or returns. It is also possible at this point of the check-out route to prepare printouts or deductions depending on insertion of a credit card. The operator station can be assigned to several check-out paths in this invention and can be set up due to this new principle, at a location where it is possible to view the goods registry segment, but only control and verification functions and any needed special intervention need be implemented.

A refinement of the invention is characterized by the fact that the operator station is equipped with another check-out unit. This refinement increases system versatility since then it is possible to set up a customer-run check-out or to distribute the check-out to the check-out unit present in the check-out path and to the check-out unit allocated to the operator station. For example, goods registry with preparation of the check-out receipt by the customer himself, is implemented while money is changing hands at the operator station of the salesperson.

Preferably, the operator station is equipped with control and monitoring devices for its part of the check-out. Thus, it is possible to affect the process of goods registry and check-out directly in the particular goods registry segment as needed, by triggering control functions from there as needed.

Likewise, the control station can be equipped with or linked to control and monitoring features for its goods output segments. Thus, it is possible to block goods output, e.g., depending on whether unregistered goods are transported through the goods output section or if incorrect or defective check-out was performed.

The check-out unit contains in a refinement of the invention, a reader for goods identifiers, a display and an input keyboard all connected to a computer. This equipment of the check-out unit allows the customer to make dialog with the computer and to implement goods registry and check-out by differing procedures.

The check-out unit can also contain a cash input and output device. This allows complete goods check-out including payment by the customer, without the salesperson having to exercise any activities in addition to oversight.

Alternatively or in additional to this refinement, the check-out unit can have a reader for credit cards and/or a reader for receipts. Thus, it is possible to conduct the already mentioned goods check-out with credit cards or to prepare receipts, which is necessary, e.g., in the case of credits or pledge repayments.

Figure 2:
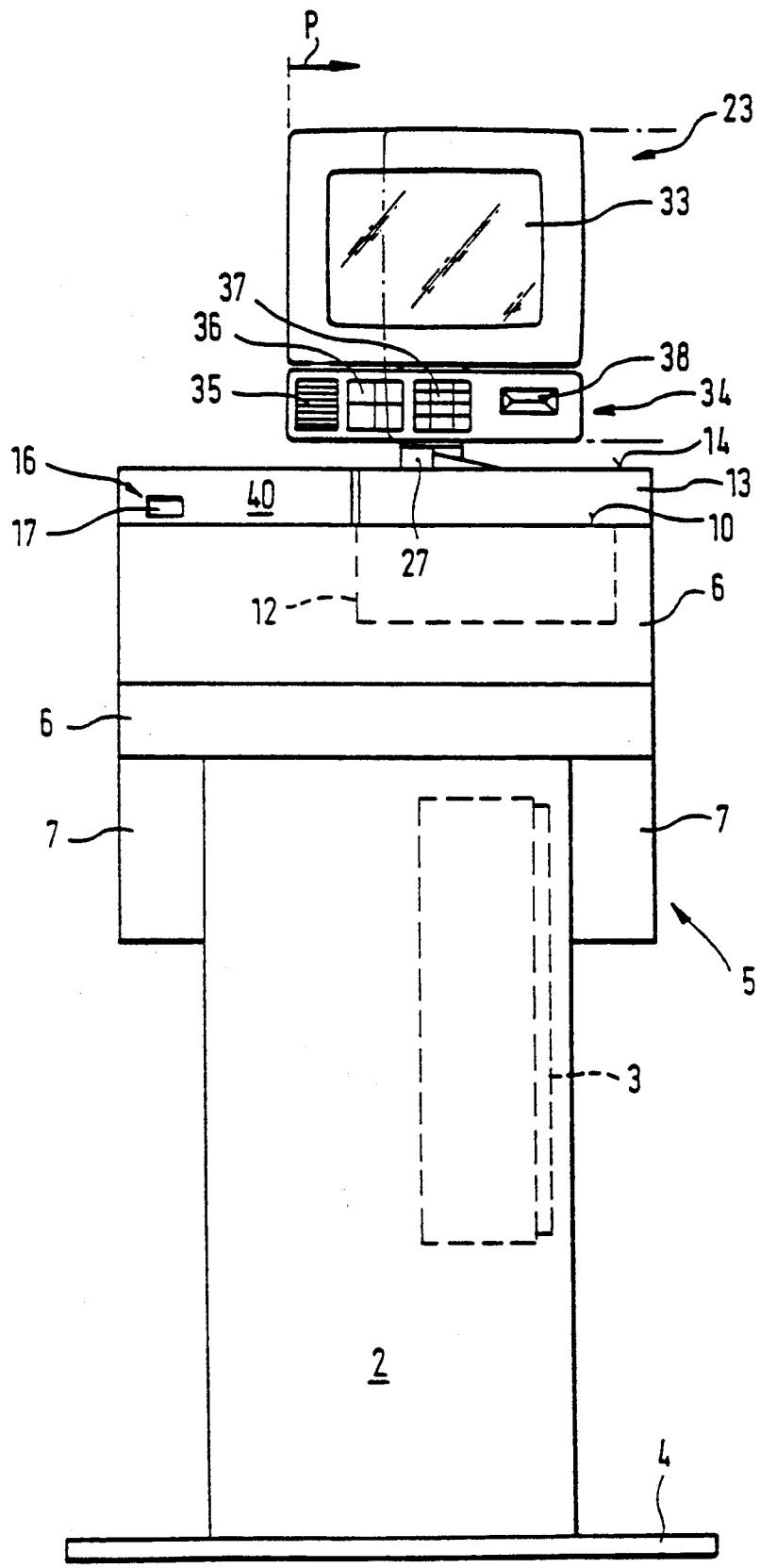
Figure 3:
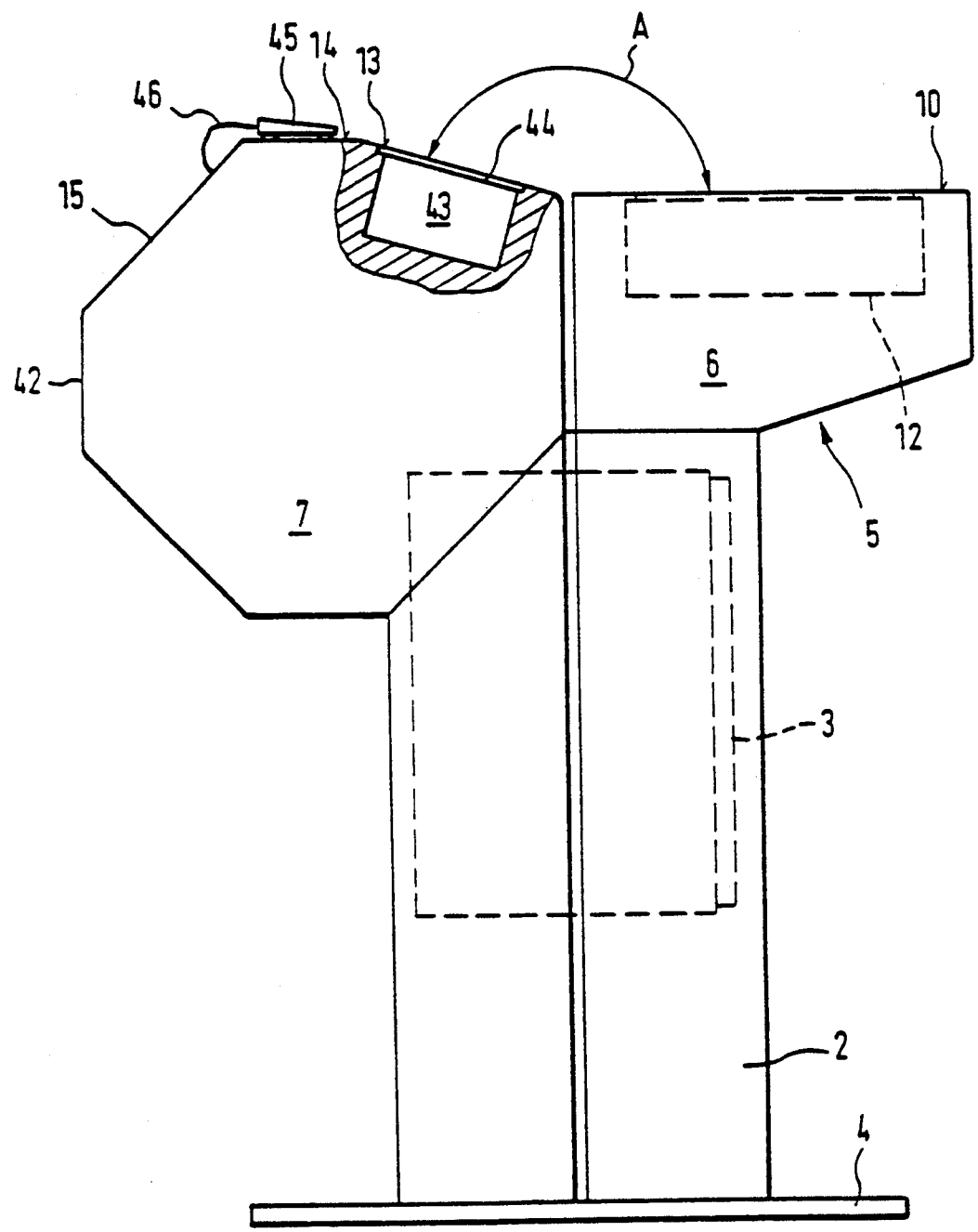
Figure 4:
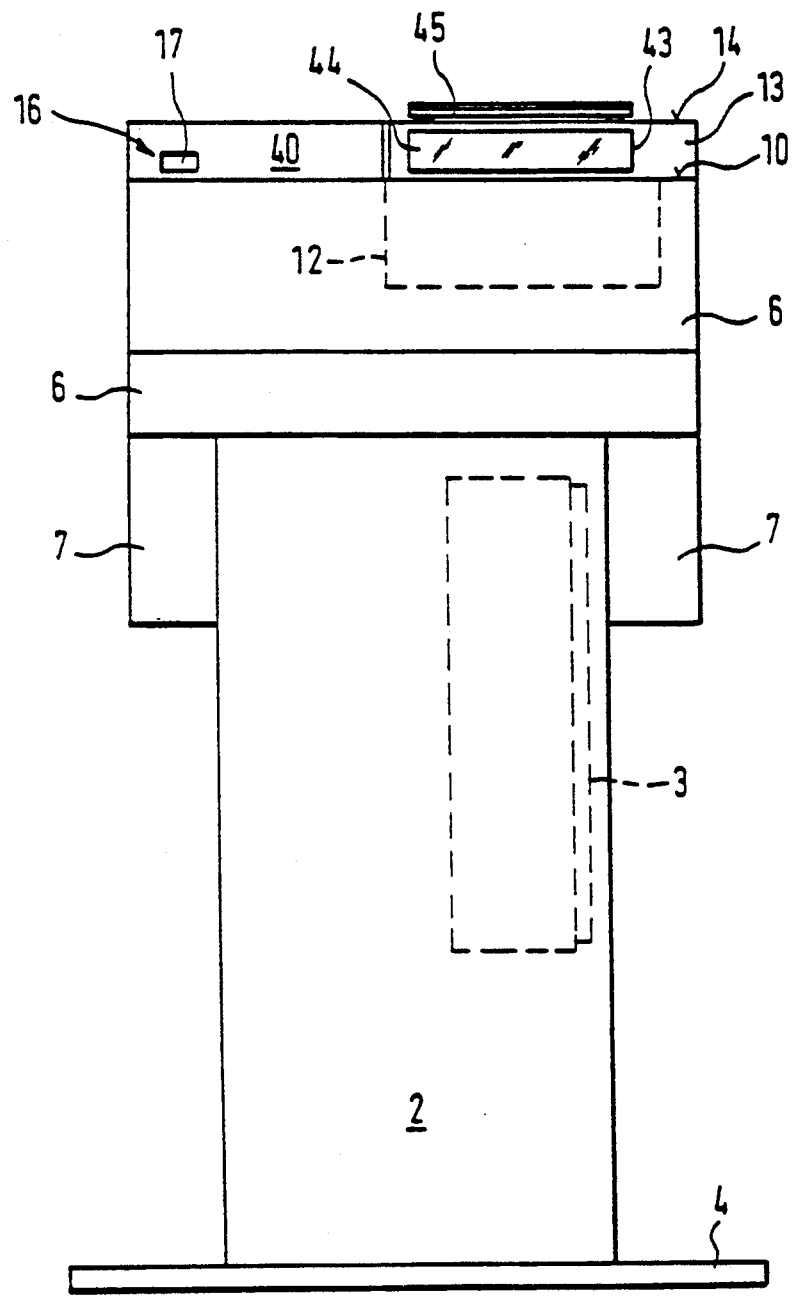
Figure 5:
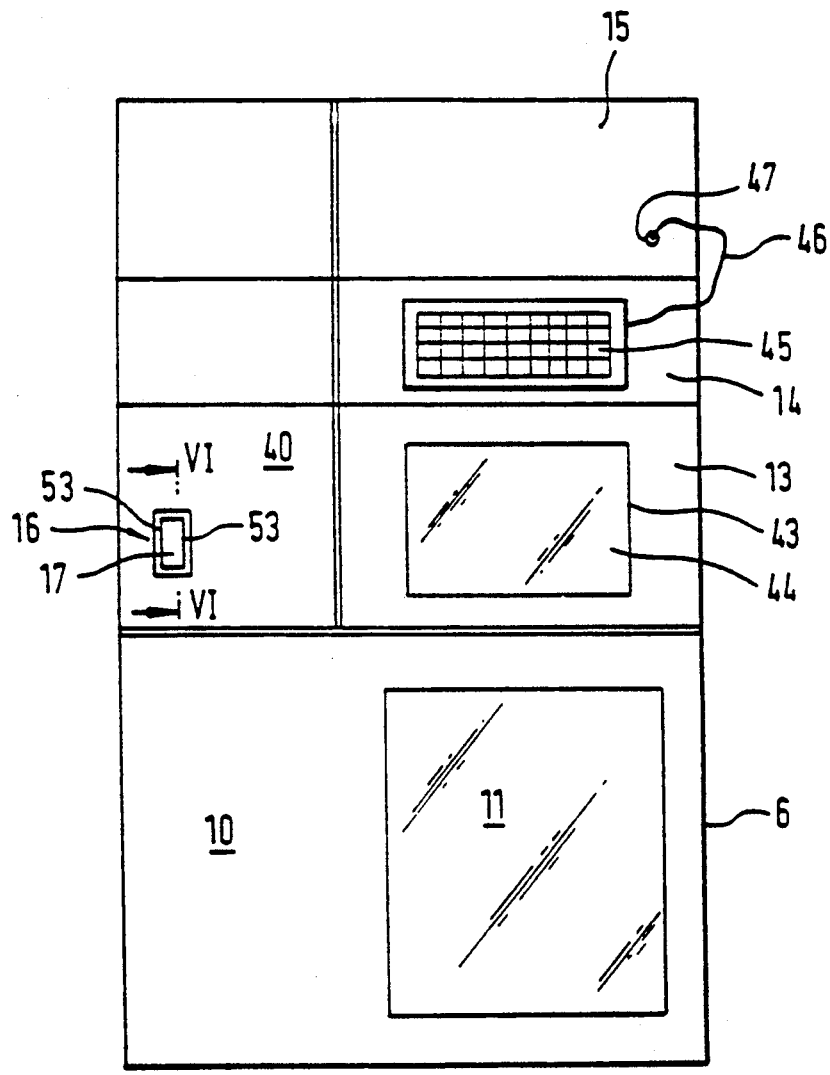
Figure 6:
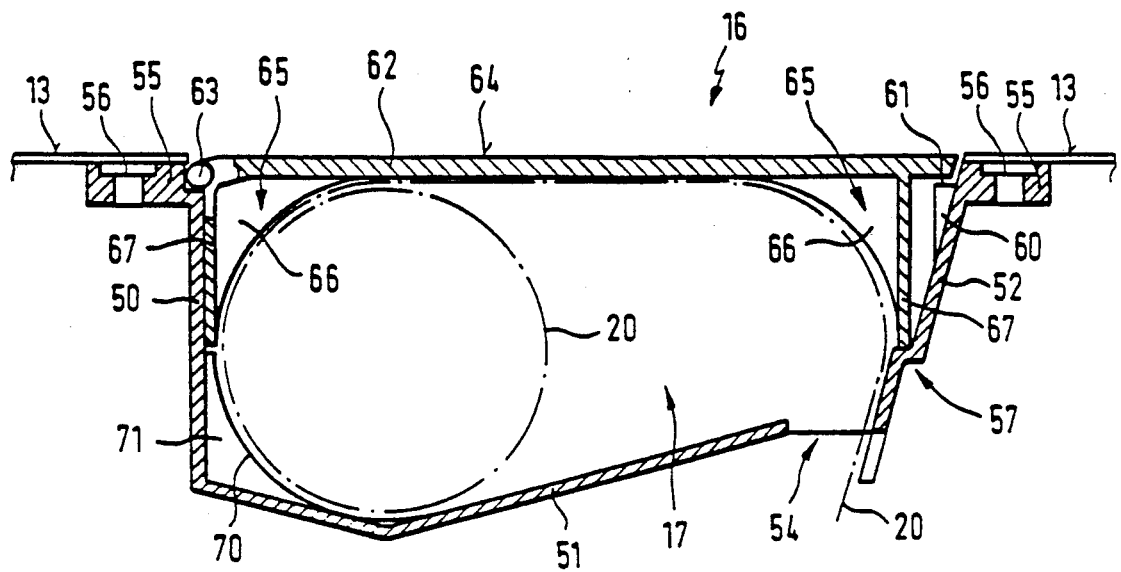
Figure 7:
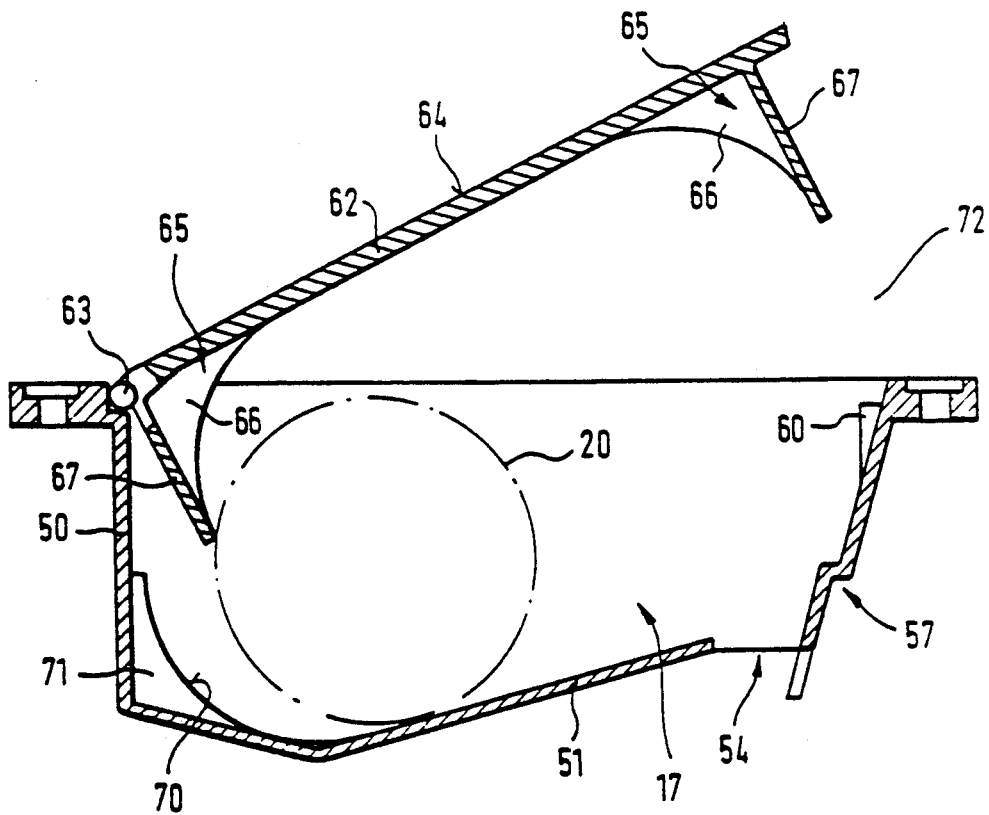
Figure 8:
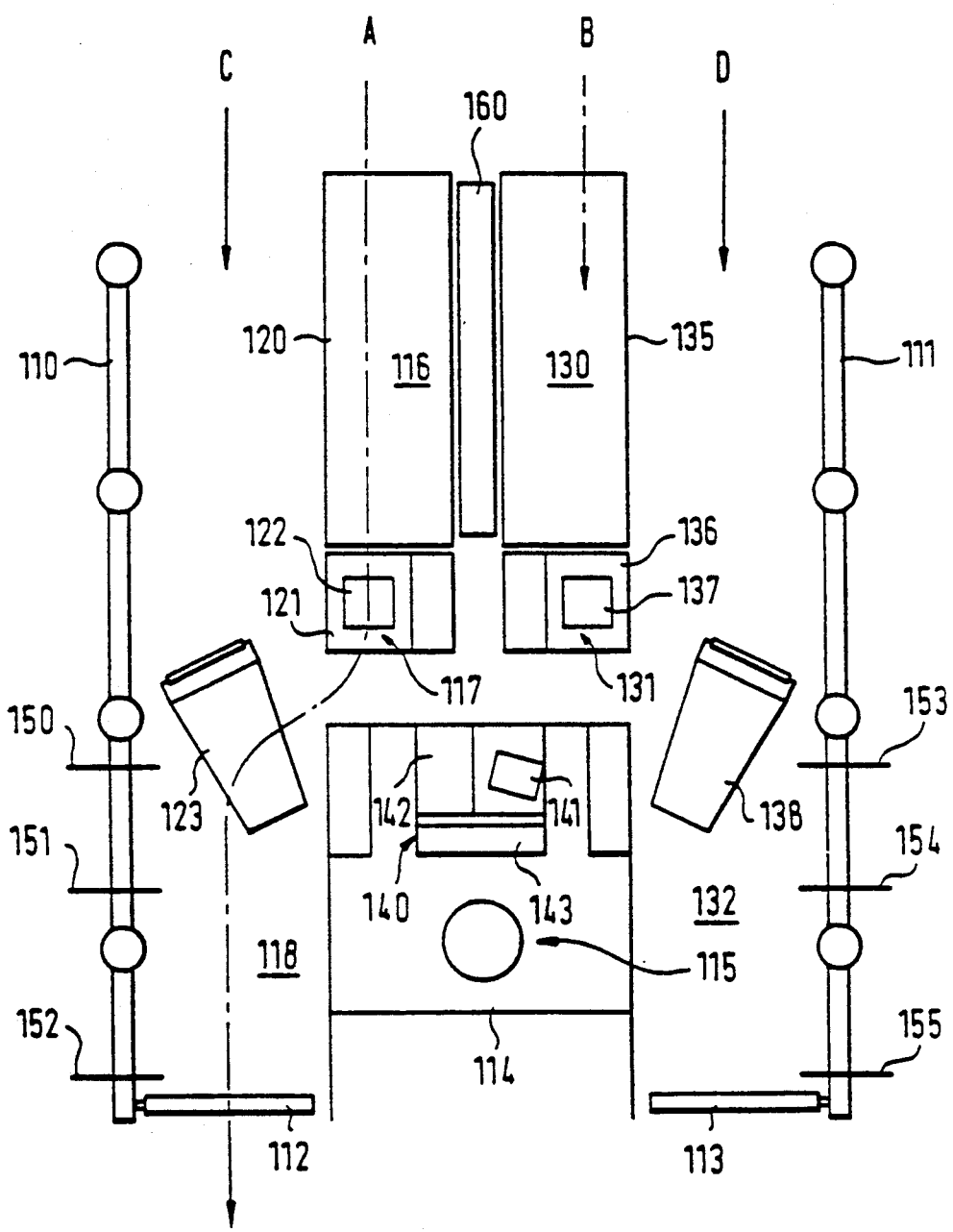
Figure 9:
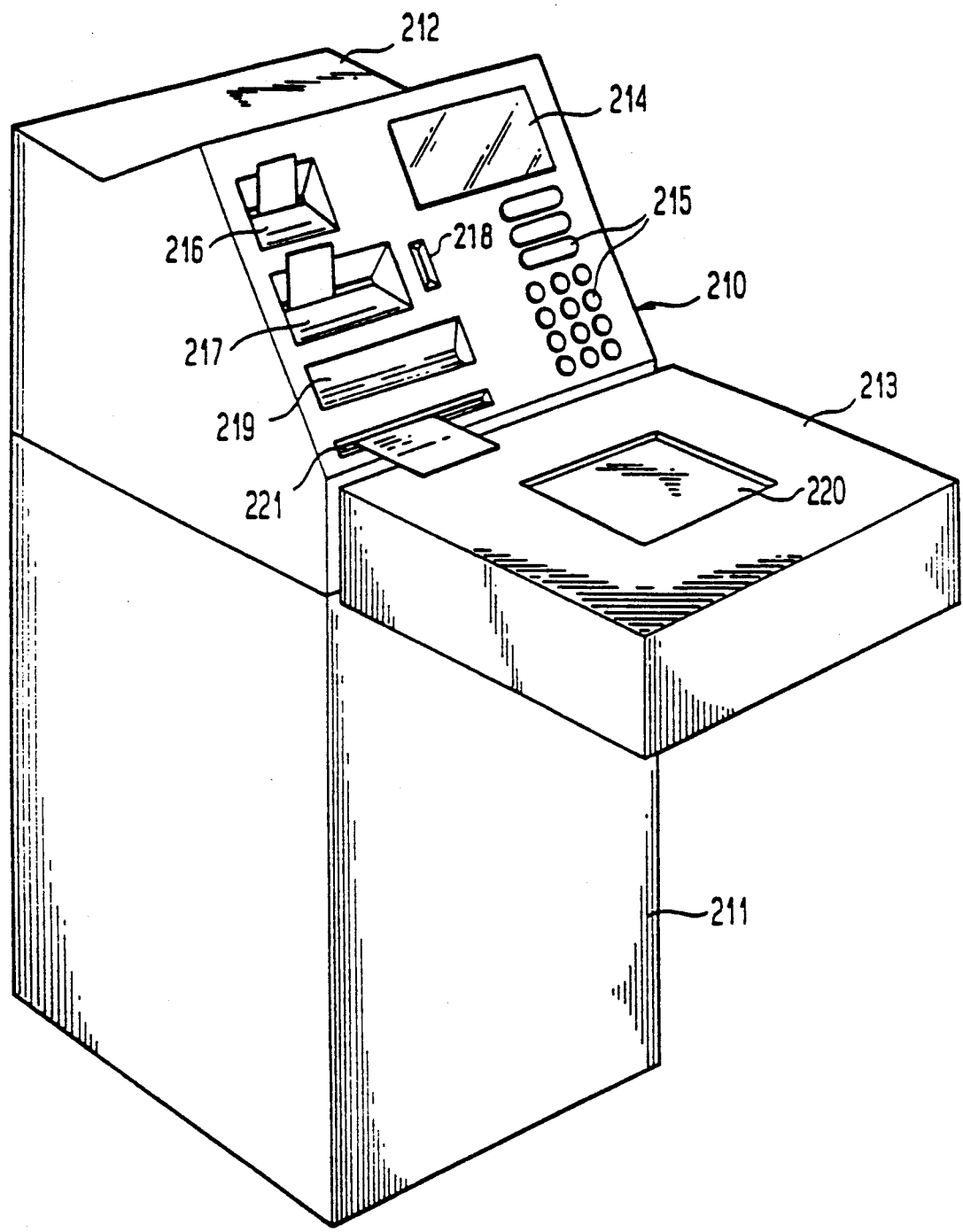
Figure 10:
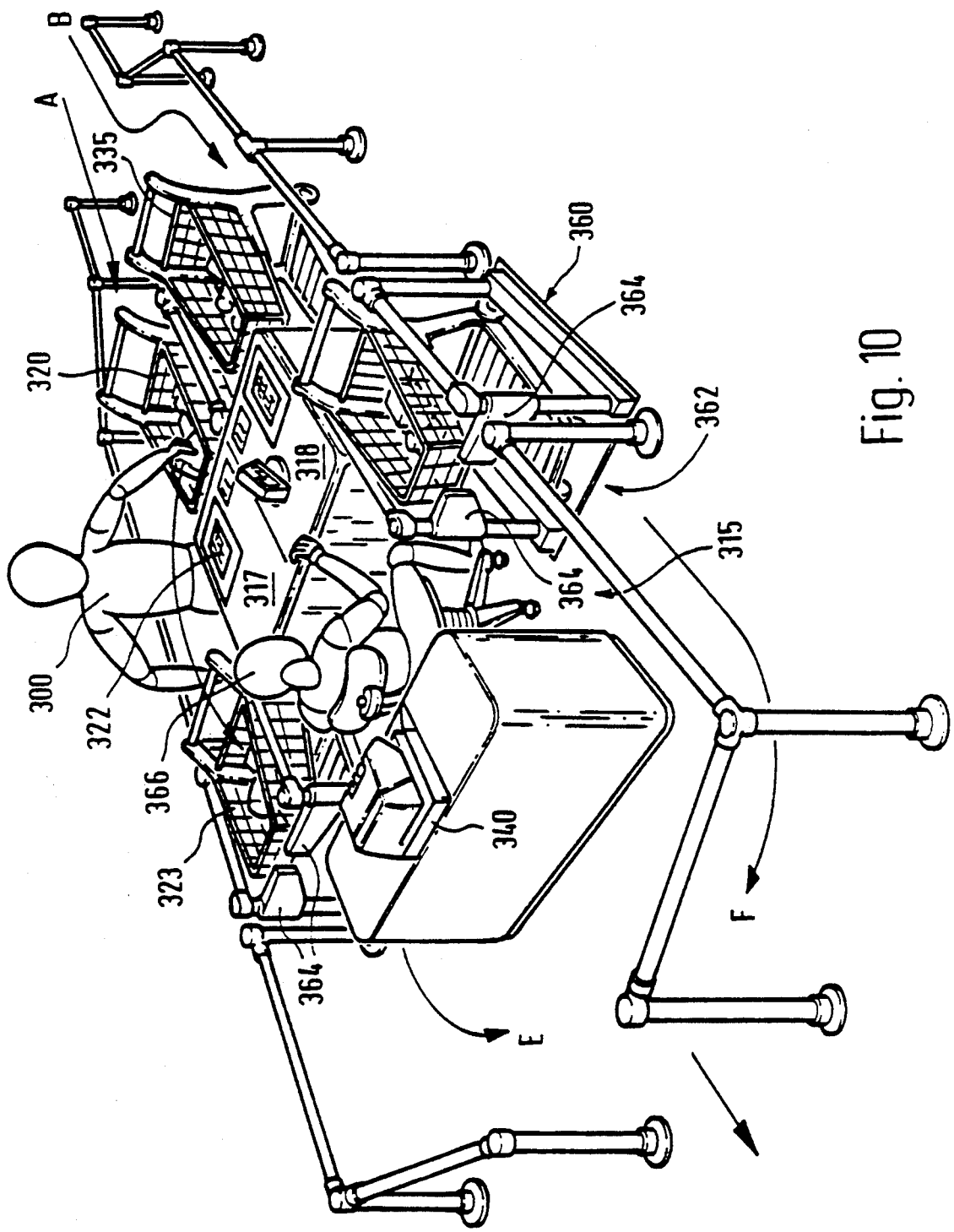
Figure 11:
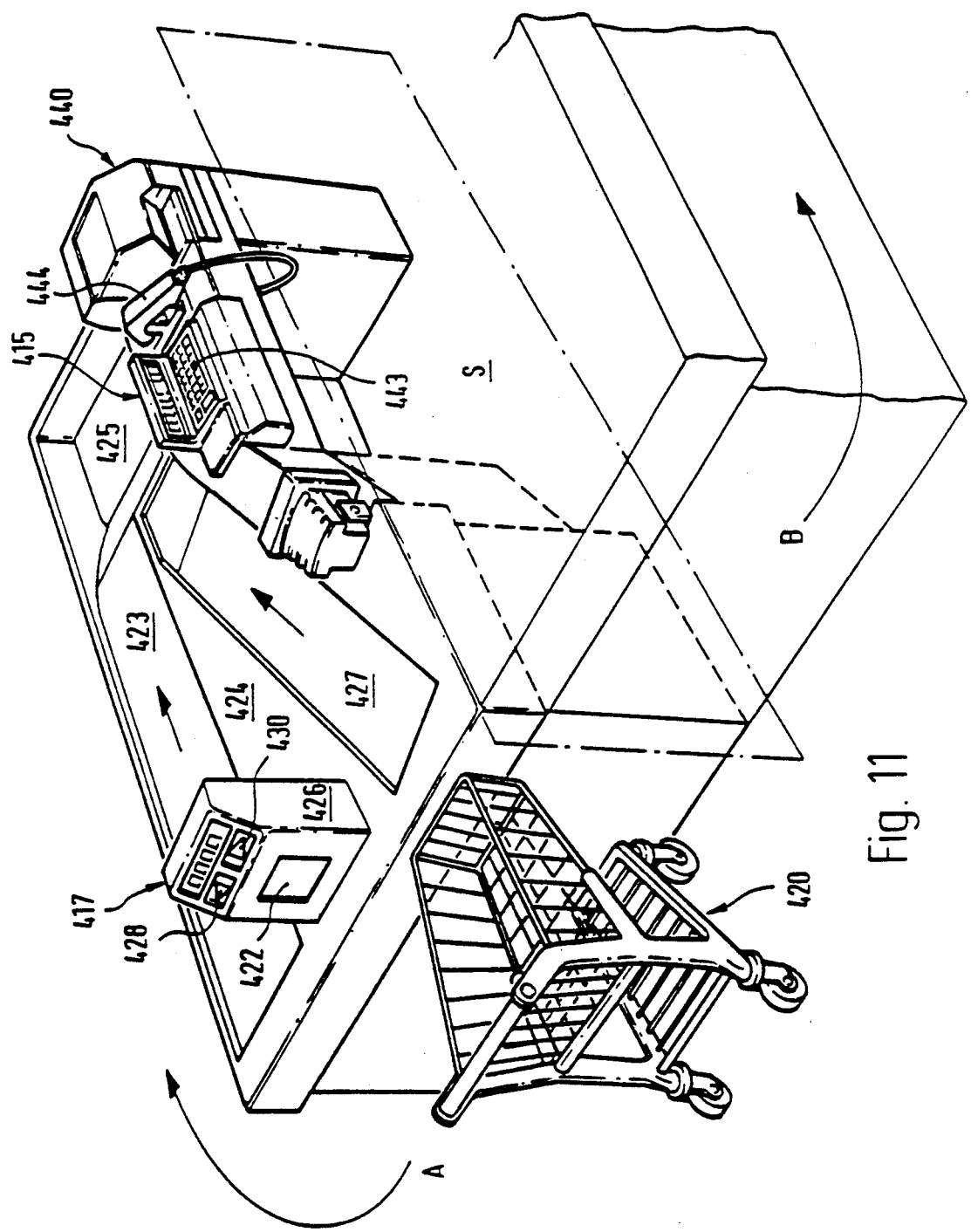

Sample designs of the invention will be explained below with reference to the figures. We have:

FIG. 1 A schematic side view of a first sample design of a goods registry device;

FIG. 2 A front view of a goods registry device according to FIG. 1;

FIG. 3 A schematic side view, partial cross-section, of another sample design of a goods registry device;

FIG. 4 A front view of a goods registry device according to FIG. 3;

FIG. 5 A top view of the goods registry device according to FIG. 3;

FIG. 6 A partial, longitudinal cut along line VI—VI in FIG. 5 through an output box for a receipt with closed flap cover;

FIG. 7 A longitudinal cut through the output box of FIG. 6 with opened flap cover;

FIG. 8 A schematic, top view of the goods registry and check-out system with two check-out paths;

FIG. 9 A perspective presentation of a check-out unit provided in a check-out paths;

FIG. 10 A perspective, schematic presentation of another sample design of the goods registry and check-out system; and FIG. 11 A perspective, schematic presentation of another sample design of the system.

FIG. 1 shows a goods registry device (1) in a side view. It has a column-like undersection (2) in which a dashed computer (3) is located. The undersection (2) is braced against a baseplate (4). On the underside (2) there is an upper part (5) divided into a front section (6) located in the right of Figure 1, and a rear section (7) shows in the left of FIG. 1. The upper side of the front section (6) is designed as a horizontal goods registry surface (10) forming a transport path in which a goods registry window (11) is provided (see FIG. 5). Underneath the goods registry window (11) there is an optical sensing device (12) shown by dashed lines in FIG. 1, to acquire machine-readable markings attached to the goods. The sensor unit (12) can be a "scanner" for bar codes. The goods registry window (11) with the upper side of the front section (6) forms a horizontal, planar surface.

The rear section (7) of the upper part (5) is formed as a polygon in FIG. 1 and on its upper side has an operator surface (13) adjoining the goods registry surface (10) transverse to the goods transport direction; said operator surface is inclined with respect to the goods registry surface (10). Slope angle (A) lies in the range of 135° to 180°, preferably in the range from 155° to 180°. According to FIG. 1, the slope angle (A) is 165°. The control surface (13) has a horizontal placement surface (14) on its side away from the front section (6); said surface (14) is adjoined by a surface (15) falling away to the rear. Control elements and/or input/output openings are provided in the operator surface (13). According to FIG. 1 in the rear section (7) there is a closeable output box (17) for a receipt (20) (see also FIG. 6) flush with the control surface (13) as output opening (16). In the rear section (7) of the upper part (5) underneath the output box (17) there is a receipt printer (21) shown in FIG. 1 by dashed lines; said printer contains a (not illustrated) supply roll fed into the output box (17) and containing data on the goods fed through the goods registry window (11). This printer (21) is generally known in cash registers as a printer for cash receipts or as a check printer. Near the output box (17) in the receipt printer (21) there is a cutter (22) that separates the printed portion of the receipt (20) from the unprinted part of the supply roll.

At the surface (15) falling away to the rear, a video terminal (23) is adjustably mounted by a support device (24). The support device (24) consists of a stand (25) with a perpendicular standing tube (26) whose upper end opens into a crank-like extender (27). The end of the extender (27) far from the standing tube bears a U-shaped mounting yoke (30) whose side arms partly surround the video terminal (23). The side arms of the mounting yoke (30) have rotary bearings (31) on their upper ends for adjustable bracing of the video terminal (23). The rotary bearings (31) have a horizontal rotary axis (32) about which the video terminal (23) can rotate by a certain amount.

The video terminal (23) has a screen (33) having a goods registry surface (10) with a control unit (34) located underneath. The data registry device (23) is illustrated in detail in FIG. 2. Accordingly, the control unit (34) contains from left to right a two-way telephone system (35), a control keyboard (36), an input keyboard (37) and a card reader (38). These control units are linked with computer (3) (not illustrated). Card reader (38) can read, e.g., credit or Customer cards for non-cash payment. For example, a personal identifier allocated to the stated cards or the goods identification data attached to the goods can be input by the input keyboard (37). By using the control keyboard (36) the end of a particular goods registry process can be reported to the computer (3); in addition, a supervisory person can be called. Conversation between user and supervisory person is possible by the telephone system (35).

The part of the housing holding the output box (17) and covering the receipt printer (21) is designed as cover hood (40) that pivots by a hinge (41) mounted to the lower end of a backside (42) of the rear section (7) of upper part (5) (see also FIG. 1). The cover hood (40) can move from its closed operating position (solid lines in FIGS. 1 and 2) into its open, readiness position (dashed line in FIG. 1) and vice versa. Thus the receipt printer (21) is accessible for repair and service purposes, like, e.g., to install a new supply roll or to replace a printer ribbon. According to FIG. 2 however, the video terminal (23) must be pushed from its position shown in FIG. 2 by means of the crank-like extender (27) into the dashed position in the direction of arrow (P) before the cover hood (40) can be moved into its open, readiness position.

A second sample design of the goods registry device is presented in FIGS. 3 to 5. The same parts are identified with the same reference symbols as in the design example according to FIGS. 1 and 2.

According to FIG. 3 a video terminal (43) with a screen (44) is used in the rear section (7) of the upper part (5) so that the screen (44) fits flush with the operating surface (13). An input keyboard (45) is located on the placement surface horizontally adjoining the operating surface (13). The input keyboard (45) can be securely joined to placement surface (14) or merely set up on it. In the latter case a junction cable (46) is provided for the input keyboard (45) and is run to the computer (3) through opening (47) in the surface (15) falling away to the back side (see FIGS. 3 and 5). The connector cable (46) can be elastic so the input keyboard (45) can be moved from the placement surface (14) in the direction of the goods registry surface (10) or the goods registry window (11). In this case, the input keyboard (45) is next to a user located near the goods registry surface (10) or the goods registry window (11), so that the input keyboard can be easily operated, i.e., without having to stoop forward.

In the above-described sample design, the separate input keyboard can be omitted if it is integrated into a part of the screen (33) or (44). In this case, the particular screen has at least partly a contact-sensitive, transparent coating. Such features are generally known as touchscreen or touch-display. But it is also possible that a control element located on control surface (13) is designed as an input keyboard (not shown). according to FIGS. 2, 4 and 5, the input keyboards (37) or (45) and the video terminals (23) or (43) are located axially one behind the other transverse to the goods registry window (11) of the goods registry surface (10). The above devices are thus set up one behind the other in a row transverse to the goods transport direction.

The output box (17) used as output opening (16) is presented in detail in FIGS. 6 and 7, which show a partial, longitudinal cross section along line VI—VI in FIG. 5. The output opening (16) is trough-shaped and has a vertically running back wall (50), an approximately V-shaped base wall (51) and a sloped front wall (52), whereby the rear wall (50) and the base wall (51) are a single piece. The output box (17) is bounded by parallel positioned side walls (53) (see FIG. 5), and the separation of the side walls corresponds at least to the width of receipt (20).

In the region near the front wall, the base wall (51) has an elongated slit (54) extending over the entire width of the output box (17) through which the receipt (20) is fed from below into the interior of the output box (17). The length of slit (54) thus corresponds at least to the width of receipt (20).

This slit makes it possible to transfer the strip-shaped receipt (20) from the receipt printer (21) (see FIG. 1) to the output box (17) without any problems.

At the upper edge of rear wall (50), of front wall (52) and of side walls (53) a horizontally running mounting frame (55) is attached and has holes (56) to hold the mounting fixtures. Such mounting fixtures can be screws welded or glued to the underside of the operating surface (13) bearing the holding box. But it is also possible to set the mounting frame onto the operating surface with or without a backspring corresponding to the dimensions and material thickness of the mounting frame (55).

The front wall (52) is sloped from the slit (54) to the mounting frame (55) and about at its middle, has a horizontal recess (57) running along the width of the receipt and near the mounting frame (55), a stop (60) whose upper side (61) runs horizontally.

The upper side of the output box (17) is closeable with a flap cover (62) that pivots about a horizontally running bearing pin (63). The bearing pin is formed on the edge where the mounting frame (55) and the back wall (50) run together. The bearing pin (63) meshes in (not illustrated) depressions in the side walls (53). The flap cover (62) has a top side (64) aligned flush to the operating surface (13). At its end pointing to the rear wall (50) and front wall (52) the flap cover has a partly cylindrical underside (65) formed as a guide rib (66) with outer wall (67) positioned transverse to the flap cover upper side (64). Both outer walls (67) like the guide ribs (66), are joined singly with the upper side (64) of the flap cover (62). The outer walls (67) have a length so they extend to about half the height of the output box (17). In the closed position of the flap cover according to FIG. 6, the outer wall (67) pointing to the front wall (52) rests on the recess (57) and the front edge of the flap cover (62) on the top side (61) of stop (60).

According to FIG. 6 the output box (17) has a partly cylindrical inner wall (70) in the region between the rear wall (50) and the base wall (51); said inner wall is fitted to the partly cylindrical underside (65) of the flap cover (62). This inner wall (70) is also designed as a guide rib (71). The radius of the partly cylindrical guide ribs (66) and (71) roughly corresponds to half the height of the entire output box (17).

In FIG. 7 the output box (17) is shown with opened flap cover, so that an opening (72) pointing to the right in FIG. 7 toward the transport path is created. In this position the outer wall (67) near the rear wall (50) extends into the interior of the output box so that the rolled up receipt (20) is forced to the right in FIG. 7 and slides upward on the base wall (51) rising up to slit (54).

Opening and/or closing of the flap cover can be done manually or automatically. For example, it is possible to open the drive automatically after final printing of receipt (20) by a (not illustrated) drive and to close it again after removal of the receipt. Opening and/or closing of the output box can also be linked to, the sensor unit (12) located under the goods registry window (11), so that the flap cover opens automatically at completion of goods registry and closes automatically when beginning goods registry for the next user.

Operation of the goods registry device is described below.

The user, e.g., a customer in a retail store, places the goods provided with goods identifiers (bar codes) onto the goods registry surface (10) in front of the view window (11) (see FIGS. 1 and 5). Next, the particular goods are moved with their goods identifiers over the goods registry window so that the sensor located under the goods registry window reads the data printed on the bar code and can display it on the screen (33) or (44) of the data display (23) or (43). For particularly bulky goods or articles having no goods identifier, the information otherwise contained on the goods identifier can be input by keyboard (37) or (45) to the goods registry device.

The receipt printer (21) located in the rear section (7) of the upper part (5) prints the data found on the goods identifier, like article type and price, on receipt (20) which is advanced from the supply roll in the printer after each printed line of goods data. Now receipt (20) moves through slit (54) of the output box (17) and slides along the guide rib (66) of the closed flap cover (62) near the front wall (52) and into the interior of the output box (17). At the rear end of the output box the receipt moves along the rear guide rib (66) down in the direction of the base wall (51) where it is diverted and then moves in the direction of the front wall (52) by control rib (71) of inside wall (70). The coil or roll formation of the receipt is simplified because the strip-like receipt is coiled preferably from the supply roll so that the arched pretension of the receipt corresponds to the supply roll of the coil or roll direction in the output box.

At completion of goods registry, the receipt (20) will be separated from the supply roll by the cutter (22). At the same time or shortly thereafter, the flap cover of the output box will be manually or automatically opened and the receipt removed from the output box. The goods run past the goods registry window (11) can be placed into a (not illustrated) shopping bag. The customer then pays the price printed on the receipt and displayed on the video terminal either by a customer- or credit card using the card reader (38) (see FIG. 2) or by money input and output openings that can be located on the operating surface (13) or in the control unit (34). If problems occur with goods registry, the customer can request a supervisory person by the control keyboard (36) and the two-way telephone system (35), or obtain operating instructions thereby.

FIG. 8 shows a top view of a goods registry and check-out system installed, e.g., in a supermarket. This system can be part of a larger system and contains two check-out lanes (A) and (B) shown as dashed lines in FIG. 8; goods to be registered and checked-out are placed on it and run through the system in the direction of the arrow. On both sides the system is bounded by railings (110) and (111) that establish the path of the customer through the system. This path is indicated in FIG. 8 by an arrow (C) on the left side of the system and by arrow (D) on the right-side of the system.

Toward the outside, the system is bounded by two normally permeable barriers (112) and (113) and by the rear wall (114) of an operator station (115). Barriers (112) and (113) are located at the end of the check-out paths (A) and (B) or customer paths (C) and (D).

As noticed in the top view of FIG. 8, the check-out paths (A) and (B) first run close together and then move around the operator station (115) where they have a correspondingly greater separation. Check-out path (A) will be described below; its run and design corresponds to that of check-out path (B).

Check-out path (A) is divided into three sections, namely a goods holding section (116), a goods registry section (117) and a goods output section (118). The goods holding section (116) in the illustrated sample design is formed by a continuous belt conveyor (120) at whose end located at the entry side of the system the customer places his goods, so that they are transported in the direction of the check-out path (A). A check-out unit (121) is located directly after the continuous belt conveyor (120) in the goods registry section (117), so that it forms a part of check-out path (A). FIG. 8 shows a window (122) in check-out unit (121) over which the goods fed by the continuous belt conveyor (120) are pushed manually by the customer to evaluate the goods identifiers on said goods by the check-out unit (121). Next, the goods must be moved farther by the customer and in the illustrated example, they are placed in a shopping basket (123) for this, and they can then be transported from the system through barrier (112) in the direction of check-out path (A).

Check-out path (B) is designed similar to check-out path (A) and consists of a goods holding section (130), a goods registry section (131) and a goods output section (132). The goods holding section (130) is also formed by a continuous belt conveyor (135); goods registry section (131) is designed with a window (137) and goods output section (132) is designed as transport route for a shopping basket (138).

The operator station (115) is designed so that the two goods registry sections (117) and (131) and also the shopping baskets (123) and (138) can be easily viewed. Another check-out unit (140) with video terminal (141), printer (142) and keyboard (143) is provided at operator station (115). A cash register can be located under these units. Thus, it is possible to observe the two goods registry sections (117) and (131) and also the shopping baskets (123) and (138) from operator station (115), but also to make money transactions and to hand out receipts. A control person seated at the operator station (115) thus can perform all supervisory and operator activities for check-out paths (A) and (B) as necessary, but normally is relieved of manual activity, because the customer himself must perform goods registry and check-out at goods registry sections (117) and (131), by operating the check-out unit (121) or (136) himself by moving the goods past its windows (122) or (137). Thus, a shift of manual activity is achieved from the operating personnel to the customer and by allocation of one control station (115) to several, in the present example to two, check-out paths (A) and (B), at least half the formerly required operating personnel are not needed.

FIG. 8 shows schematically in the particular goods output section (118) or (132), sensors (150, 151, 152 or 153, 154, 155). They can monitor the particular goods output sections (118) or (132). For example, the three sensors can be placed at different levels in the profile of the goods output section (118) or (132) to acquire transported goods that are not transported in, but under the particular shopping basket (123) or (138) through goods output section (118) or (132). This monitoring can occur for example, with sensor (150) or (153). The sensors (151) and (154) can be personnel sensors that indicate the passage of a person through the goods output section (118) or (132), if the supervisory person at the operator station is watching the other goods check-out section. Depending-on whether the passage of a person at this time is justified or not, a signal can be output to request the person to return to the goods registry section. Sensors (152) and (155) can also be personnel sensors that again ascertain persons passing unauthorized through the particular goods output section (118) or (132) and then immediately lock the particular barrier (112) or (113) by the check-out unit (140) of the operator station (115).

Between the two goods holding sections (116) and (130) shown in FIG. 8 or between the continuous belt conveyors (120) and (135) there is a goods return device (160) that in this example runs over practically the entire length of the two continuous belt conveyors (120) and (135). This type of goods return device has the purpose of allowing the customer to set back nonregistered, nonregisterable goods or goods not desired for purchase. The goods return device, like the two goods registry sections (117) and (131), also is located in the field of view of the operator station (115).

In contrast to the arrangement shown in FIG. 8 where the two check-out paths (A) and (B) run parallel-to each other, arrangements can also be created where the check-out paths run at a slant to each other or star-shaped, especially if an operator station is allocated to more than two check-out paths.

FIG. 9 shows a check-out unit (210) in perspective view, as provided in the goods registry sections (117) and (131) shown in FIG. 8. This check-out unit (210) has a housing with a lower unit (211) and an upper unit (212). In the lower unit (211) there is a computer and a cash input/output device. Above the lower part (211) and in front of upper part (212) there is a goods registry table (213) having a window (220) under which an optical sensor for machine-readable goods identifiers is located. The goods are run past the goods registry table (213) by the customer and optically scanned by the window (220). The obtained data are fed to the computer provided in the lower part (211) and are evaluated there.

The upper housing part (212) has an operator surface running slant upwards and adjoining the goods registry table (213), in the right part a video terminal (214) and a keyboard (215), that contains an alpha-numeric and a section of command keys. In the left part of the operator surface there are openings for a receipt reader or credit card reader (216), a currency input device (217), a coin input device (218), a money return device (219) and a receipt printer (221). The attendant devices are located behind the opening in the upper part (212).

The device shown in FIG. 9 makes it possible for a customer to input the price and/or article information present on the goods on the goods registry table (213). The computer present in the lower part (211) evaluates the contained data and causes a data display on the video terminal (214), so that the customer can check the accuracy of data registry. By keyboard (215) the customer can affect the data registry and evaluation, e.g., request termination of calculation or initiate a return or also request an operator. The justification required for a subtraction or acknowledgements and other receipts will be input or output by the openings on the left side of the operator field.

Another sample design of the goods registry and check-out system is shown in FIG. 10. The goods holding sections are formed here by shopping baskets (320) or (335). Customer (300) takes the goods from his shopping basket (320), moves them past the goods registry window (322) of the goods registry section (317) and places them in a second shopping basket (323). In contrast to the sample design of FIG. 8, the second shopping basket (323) stands on a scale. This is illustrated in the figure only for check-out path (B) and identified as (360) there. Operation of this scale is similar to that of the first scale in U.S. Pat. No. 47 79 706. Scale (360) is surrounded by a cage (362) in which the shopping basket is enclosed. The exit path (E) or (F) is blocked by barriers (364) locked in position. These barriers correspond to the barrier devices (112, 113) in the design according to FIG. 8.

Operator station (315) is located in this example so that an operator (366) is seated directly next to the registry sections (317, 318). This has the advantage that oversight can be more accurate. Furthermore, the operator (366) can intervene directly in registry difficulties, so that no assistance call button is needed on the registry station. The operator station can be equipped with an input keyboard and/or a hand scanner for goods identification.

Behind the operator (366) there is a check-out unit (340) so that the operator can readily see the registry sections (317, 318). The operator (366) need turn around only to handle the cash transaction. Once the payment transaction is completed, the barriers (364) are automatically unlocked. They can then be struck with the exiting shopping cart and after it passes through, they return to their locked position. The next customer pushes the empty shopping cart of this predecessor into cage (362) in which it is enclosed, and places his purchase goods into this cart.

The sample design shown in FIG. 11 is particularly suitable for assisting customers in checking-out goods with non(machine-readable) goods identifier. Again, two check-out paths (A),(B) are used, of them only path (A) will be discussed in detail. Check-out path (B) is of mirror-image design to check-out path (A), and (S) shows the plane of symmetry. Only check-out unit (440) is provided on only one path. The goods holding section is again formed by a shopping basket (420). For goods registry, the customer places the shopping basket (420) in front of the front side of the goods registry section (417). The goods registry section has a vertical goods registry window (422)—in contrast to the other sample designs—that is housed in a housing extending beyond the table surface (424). Above the goods registry window (422) there are two arrow-like signal lamps (428, 430) of which the left one points at a transport belt (423) that ends in a packing pit (425) and the right one points to a second transport belt (427) that ends in front of the operator station (415).

The customer takes the purchase goods from his shopping basket (420) and moves them with the goods identifier past the goods registry window (422). If goods identifier is registered properly, the signal lamp pointing to the transport belt (423) lights up, so that the customer can place the registered article there. If the goods identifier is not registered, the signal lamp (430) pointing to the second transport belt (427) lights up, so that the customer is thereby requested to place the non-registered article there. At the same time, an acoustic signal sounds to alert the worker of a nonregistered article. Goods placed by the customer on the other transport belt (423) in spite of the signal can be easily noticed by operating personnel.

The goods registry device behind the goods registry window (422) is designed preferably as a scanner recognizing the direction of motion of the goods. This ensures that the goods identifiers are only registered when the articles are moved in the direction toward the first transport belt (423) and not in the reverse direction. On the other hand, goods that are to be placed on the second transport belt (427), are not erroneously registered.

Goods located on the transport belt (427) move to the operator station (415) where they are input by operator personnel by an input keyboard (443) or a hand reader (444) and can then be manually moved to the packing area (425).

We claim:

1. A self-service customer check out device positioned at a check out station wherein a customer checks out goods without the aid of an operator, comprising:
    a goods registry and supporting check out surface across which the customer may move the goods during check out;
    means, including a goods registry window in said check out surface, for automatically registering the goods as the customer moves the goods across the check out surface;
    a control keyboard generally facing the customer at the check out station for allowing input by the customer of control information regarding the goods;
    a data input keyboard generally facing the customer at the check out station for allowing the input of data regarding registry of the goods by the customer;
    a video display unit generally facing the customer for displaying the control information input by the customer at the control keyboard, and for displaying the registry data input by the customer at the data input keyboard;
    a control surface immediately adjacent to and substantially contiguous to the check out surface, the control surface being inclined relative to the check out surface to provide a smooth transition between them;
    an upper part carrying said check out surface and said control surface; and
    an adjustable support mounted to said upper part, said video display nit being placed on said support to position said screen in a location favorable for the customer, said support including means to pivot said video display unit away from said control surface to prevent interference with the goods.

2. The self-service customer check out device of claim 1, wherein said control surface is inclined relative to said check out surface at an angle of slope between 155 degrees and 180 degrees.

3. The self-service customer check out device of claim 1, wherein said data input keyboard is associated with said video display unit.

4. The self-service customer check out device of claim 1, herein at least one of said data input keyboard and said control keyboard are mounted in said control surface.

5. The self-service customer check out device of claim 1, wherein said video display unit is formed in said control surface.

6. The self-service customer check out device of claim 1, wherein said control keyboard and said data input keyboard are mounted adjacent to each other, and beneath said video display unit.

7. The self-service customer check out device of claim 1, including means for outputting a receipt to the customer, said output receipt means being formed in said inclined surface.

8. A self-service customer check out device, comprising:
    a framework including an upper part;
    a goods registry device, said registry device comprising an upper, essentially horizontal, goods registry surface carried by said upper part and forming a transport path for goods and including a goods registry window;
    a control surface adjoining said goods registry surface transverse to a goods transport device and carried by said upper part, said control surface including control elements and at least one of an input opening and output opening, and having a slope compared to said registry surface, said slope having an angle between 135 degrees and 180 degrees;
    a video terminal having a screen adjustably mounted by a support device to said control surface; and
    an input keyboard, said keyboard located on said terminal.

9. A self-service customer check out device, comprising:
    a framework including an upper part;
    a goods registry device, said registry device comprising an upper, essentially horizontal, goods registry surface carried by said upper part and forming a transport path for goods and including a goods registry window;
    a control surface adjoining said goods registry surface transverse to a goods transport device and carried by said upper part, said control surface including control elements and at least one of an input opening and output opening, and having a slope compared to said registry surface, said slope having an angle between 135 degrees and 180 degrees;
    a video terminal having a screen adjustably mounted by a support device to said control surface; and
    a data input means, said input means integrated as a part of said screen.

* * * * *